UNITED STATES PATENT OFFICE.

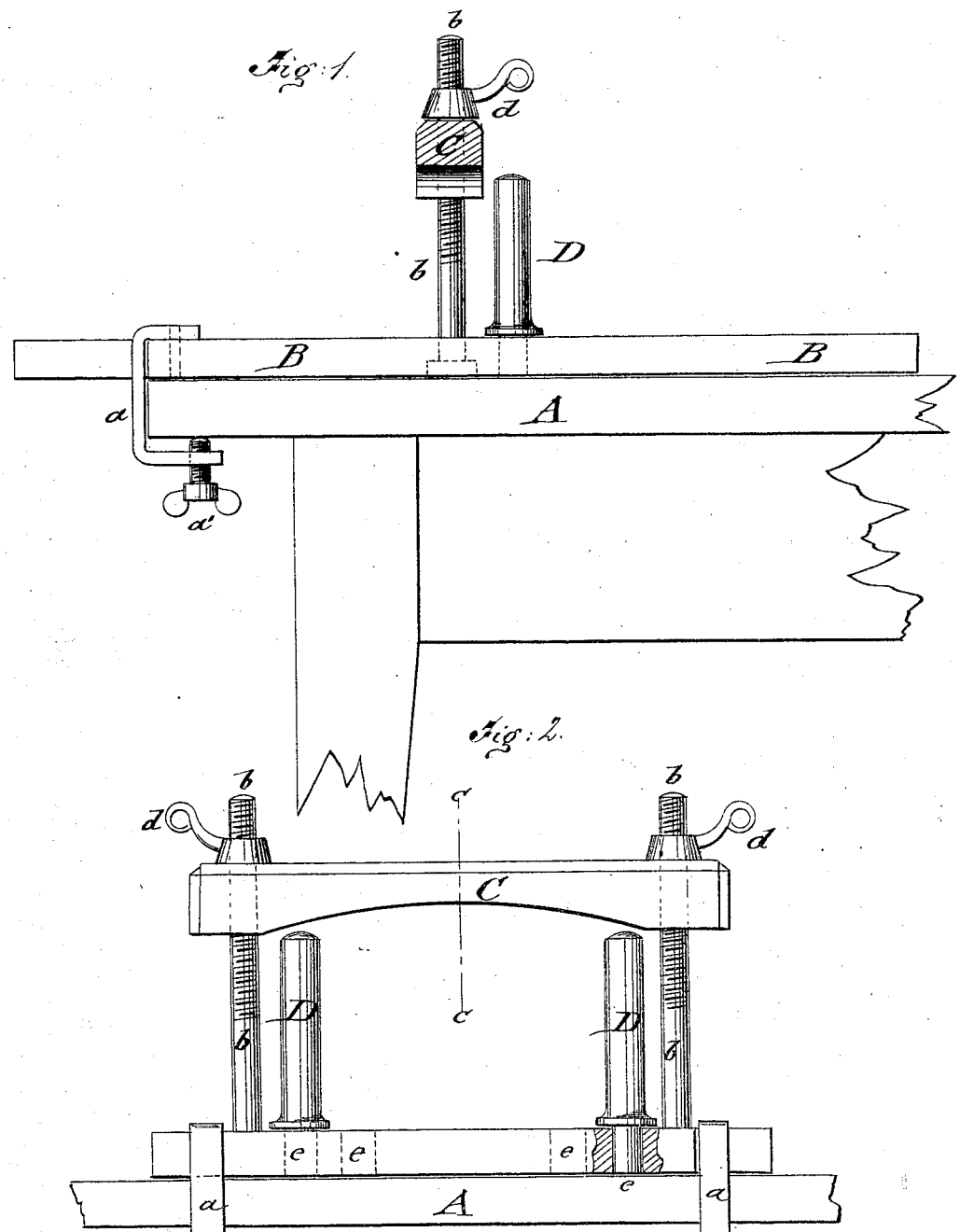

SARAH BEISSEL, OF SHAMOKIN, PENNSYLVANIA.

IMPROVEMENT IN MEAT-HOLDERS.

Specification forming part of Letters Patent No. 145,329, dated December 9, 1873; application filed August 30, 1873.

*To all whom it may concern:*

Be it known that I, SARAH BEISSEL, of Shamokin, in the county of Northumberland and State of Pennsylvania, have invented a new and Improved Meat-Holder, of which the following is a specification:

In the accompanying drawing, Figure 1 represents a side elevation, partly in section, on the line *c c*, Fig. 1, of my improved meat-holder board as applied to a table; and Fig. 2, a front view of the same.

Similar letters of reference indicate corresponding parts.

The object of my invention is to furnish to hotels, restaurants, boarding-houses, and families an improved meat-holder, by means of which hams and other meats may be regularly and easily cut with greater convenience and dispatch. My invention consists of a board which is applied with set-screws to a table, and carries on vertical screw-bolts a concave cross-bar, which is screwed down on the meat to be held in place, supporting it also sidewise by adjustable rollers.

In the drawing, A represents the table or other article of furniture, to which the meat-board is rigidly applied by clamps and set-screws *a a'*. Two vertical screw-bolts, *b*, are set firmly into the board, made of wood or iron, and carry the lateral cross-bar C. Cross-bar C is concaved at the lower side, and pressed, by the thumb-screws *d*, on the meat placed on the board B between the bolts *b*. Vertical guide-rollers D are placed in holes *e* of the board and retain the meat sidewise. Rollers D are placed to the rear of and between the bolts *b*, and set into any of the holes *e*, as the thickness of the meat requires. The meat is thereby held firmly at the sides and top, and may, therefore, conveniently be cut into the nicest slices, and also easily be fed forward between rollers D by merely releasing cross-bar C and fastening the same again.

Having thus described my invention, I claim as new and desire to secure by Letters Patent—

The meat-holder, consisting of a board, B, having vertical screw-bolts *b*, with lateral cross-bar C, which is pressed on the meat by thumb-screws *d*, and vertical side rollers D adjustable in holes *e* of the board, to clamp the meat firmly and feed it for cutting, substantially as specified.

SARAH BEISSEL.

Witnesses:
J. ZIMMERMAN,
GEORGE B. LINTON.